(12) United States Patent  (10) Patent No.: US 7,806,411 B2
Grimanis  (45) Date of Patent: Oct. 5, 2010

(54) RADIAL SEAL ASSEMBLY

(75) Inventor: Michael P. Grimanis, Wayland, MA (US)

(73) Assignee: A.W. Chesterton Company, Woburn, MA (US)

( * ) Notice: Subject to any disclaimer, the term of this patent is extended or adjusted under 35 U.S.C. 154(b) by 764 days.

(21) Appl. No.: 11/604,518

(22) Filed: Nov. 27, 2006

(65) Prior Publication Data

US 2008/0122181 A1    May 29, 2008

(51) Int. Cl.
*F16J 15/02* (2006.01)
(52) U.S. Cl. .................. 277/551; 277/571; 277/562
(58) Field of Classification Search ............. 277/500, 277/510–511, 529, 549, 551, 571, 562, 585
See application file for complete search history.

(56) References Cited

U.S. PATENT DOCUMENTS

| | | | |
|---|---|---|---|
| 2,443,332 A | | 6/1948 | Summers |
| 2,945,709 A | * | 7/1960 | Freed et al. .................. 277/511 |
| 3,575,426 A | * | 4/1971 | Durham ....................... 277/432 |
| 3,866,924 A | * | 2/1975 | French ......................... 277/505 |
| 3,871,666 A | * | 3/1975 | Franz et al. .................. 277/563 |
| 5,009,435 A | * | 4/1991 | Villanyi et al. ............... 277/552 |
| 5,199,718 A | * | 4/1993 | Niemiec ....................... 277/552 |
| 5,295,549 A | | 3/1994 | Dolezal et al. |
| 6,095,780 A | * | 8/2000 | Ernens ......................... 418/104 |
| 6,224,322 B1 | * | 5/2001 | Calboreanu ................... 415/34 |
| 6,231,048 B1 | | 5/2001 | McAnally, Jr. |
| 6,761,359 B2 | | 7/2004 | Azibert |

* cited by examiner

*Primary Examiner*—Vishal Patel
(74) *Attorney, Agent, or Firm*—Lahive & Cockfield, LLP; Anthony A. Laurentano, Esq.

(57) ABSTRACT

A radial seal assembly for providing a seal between a shaft and a static surface includes a gland forming a housing for mounting the seal assembly to the stationary equipment, a sleeve mounted to an movable with a shaft extending from the stationary equipment and a sealing component housed between the gland and sleeve for sealing therebetween. The sealing component includes at least one axially forwarding extending seal surface and at least one axially rearward extending seal surface for providing sealing under both normal and reverse pressure conditions. The sleeve may include a tapered axially inner tip having a double lead-in angle to facilitate assembly while minimizing the length of the seal assembly.

12 Claims, 8 Drawing Sheets

RADIAL SEAL ASSEMBLY

FIELD OF THE INVENTION

The present invention relates to a seal assembly for sealing a shaft relative to a stationary housing component. In particular, the invention relates to a radial seal assembly for sealing a fluid under both positive and negative pressure conditions.

BACKGROUND OF THE INVENTION

Conventional sealing assemblies are employed in a wide variety of environments and settings, such as for example, in mechanical apparatuses, to provide a fluid-tight seal. The sealing assemblies are usually positioned about a rotating shaft or rod that is mounted in and protrudes from a stationary mechanical housing.

Conventional sealing systems can employ a number of annular elastomeric sealing elements or mechanical sealing devices disposed within a groove formed in a gland in the housing or mounted to externally to the apparatus housing The annular sealing elements are sized to provide interference between the sealing elements and the outer surface of the rod. The degree of interference provided preferably allows smooth axial movement of the rod through the sealing elements while concomitantly providing fluid sealing between the rod and the gland.

Such conventional sealing systems suffer from a number of deficiencies. The annular sealing elements do not retain the appropriate interference to maintain sealing integrity. Also, depending on the characteristics of the fluid, these elements may deform due to adhesion created from the high viscosity of the fluid and/or reaction and subsequent solidification of the fluid. In the case of axial mechanical seal devices, which typically utilize ceramic, carbon and other hard face materials, these faces can be destroyed due to the effects of adhesion between the stationary and dynamic faces. The adhesion occurs during the down period of the equipment. The characteristics of operating in high viscosity fluids also have detrimental effects on the operation of such devices.

SUMMARY OF THE INVENTION

It is thus an object of the invention to provide a seal assembly having seal elements that maintain sealing contact with the rod throughout a wide range of operating conditions including pressure-reversal conditions.

It is another object of the invention to provide a seal assembly having seal elements that maintain sealing engagement with the rod without necessitating frequent monitoring, replacement, or adjustment of the seal assembly.

It is further another object of the invention to provide a seal assembly having split components that facilitate monitoring, installation and replacement of the seal assembly.

The present invention provides an improved radial seal assembly for sealing between a shaft and stationary equipment. The radial seal assembly includes a gland forming a housing for mounting the seal assembly to the stationary equipment, a sleeve mounted to and movable with a shaft extending from the stationary equipment, and a sealing component housed between the gland and sleeve for sealing therebetween. The sealing component includes at least one axially forwarding extending seal surface and at least one axially rearward extending seal surface for providing sealing under both normal and reverse pressure conditions. The sleeve may include a tapered axially inner tip having a double lead-in angle to facilitate assembly while minimizing the length of the seal assembly.

According to a first aspect of the invention, a radial seal assembly for providing a seal around a shaft extending from stationary equipment is provided. The radial seal assembly comprises a sleeve disposed about the shaft, a gland, connected to the stationary equipment surrounding at least a portion of the sleeve and defining a chamber on a radially inner surface thereof, and a sealing component disposed in the chamber. The sealing component comprises a plurality of seal elements extending from a radially inner surface for sealing against a radially outer surface of the sleeve. The plurality of seal elements including first seal element comprising a radially extending portion projecting from the radially inner surface and a first seal surface extending in an axially rearward direction from an end of the radially extending portion of the first seal element.

According to another aspect of the invention, a radial seal assembly includes a sleeve disposed about the shaft, including a cylindrical sleeve body having an annular outer surface that is substantially parallel to a longitudinal axis of the sleeve and forming a tapered tip at an axially inner end, and a flange at an axially outer end. The tapered tip includes a first stage extending from the outer surface towards the axially inner end of the seal assembly at a first lead-in angle relative to the outer surface and a second stage extending from the first stage at a second angle relative to the outer surface and terminating in an axially inner end of the sleeve. The first lead-in angle and the second lead-in angle are different. The radial seal assembly further comprises a gland connected to the stationary equipment surrounding at least a portion of the sleeve and defining a chamber on a radially inner surface thereof and a sealing component disposed in the chamber including at least one sealing surface for sealing against the outer surface of the sleeve.

According to another aspect of the invention, a sealing component for a radial seal assembly comprises an annular body, a first sealing surface extending in a first axial direction from a radially extending portion projecting from a radially inner surface of the annular body and a second sealing surface extending from a radially extending projection projecting from the radially inner surface. The second sealing surface extends in a second axial direction opposite the first axial direction.

BRIEF DESCRIPTION OF THE DRAWINGS

These and other features and advantages of the present invention will be more fully understood by reference to the following detailed description in conjunction with the attached drawings in which like reference numerals refer to like elements through the different views. The drawings illustrate principals of the invention and, although not to scale, show relative dimensions.

DETAILED DESCRIPTION OF THE PREFERRED EMBODIMENTS

The present invention provides a radial seal assembly for providing sealing between a stationary housing and a rotating shaft, or other suitable device. The invention will be described below relative to illustrated embodiments. Those skilled in the art will appreciate that the present invention may be implemented in a number of different applications and embodiments and is not specifically limited in its application to the particular embodiment depicted herein.

The terms "seal assembly" and "sealing assembly" as used herein are intended to include various types of sealing assemblies, including single seals, split seals, concentric seals, spiral seals, and other known seal and sealing assembly types and configurations.

The term "shaft" is intended to refer to any suitable device in a mechanical, to which a seal can be mounted and includes shafts, rods and other known devices.

The terms "axial" and "axially" used herein refer to a direction generally parallel to the axis of a shaft. The terms "radial" and "radially" used herein refer to a direction generally perpendicular to the axis of a shaft. The terms "fluid" and "fluids" refer to liquids, gases, and combinations thereof.

The term "axially inner" as used herein refers to the portion of stationary equipment and a seal assembly proximate the mechanical system employing the seal assembly. Conversely, the term "axially outer" as used herein refers to the portion of stationary equipment and a seal assembly distal from the mechanical, system.

The term "radially inner" as used herein refers to the portion of the seal assembly proximate a shaft. Conversely, the term "radially outer" as used herein refers to the portion of the seal assembly distal from a shaft.

The terms "stationary equipment", "static surface" and "gland" as used herein are intended to include any suitable stationary structure housing a shaft or rod to which a seal is secured.

Figure 1:
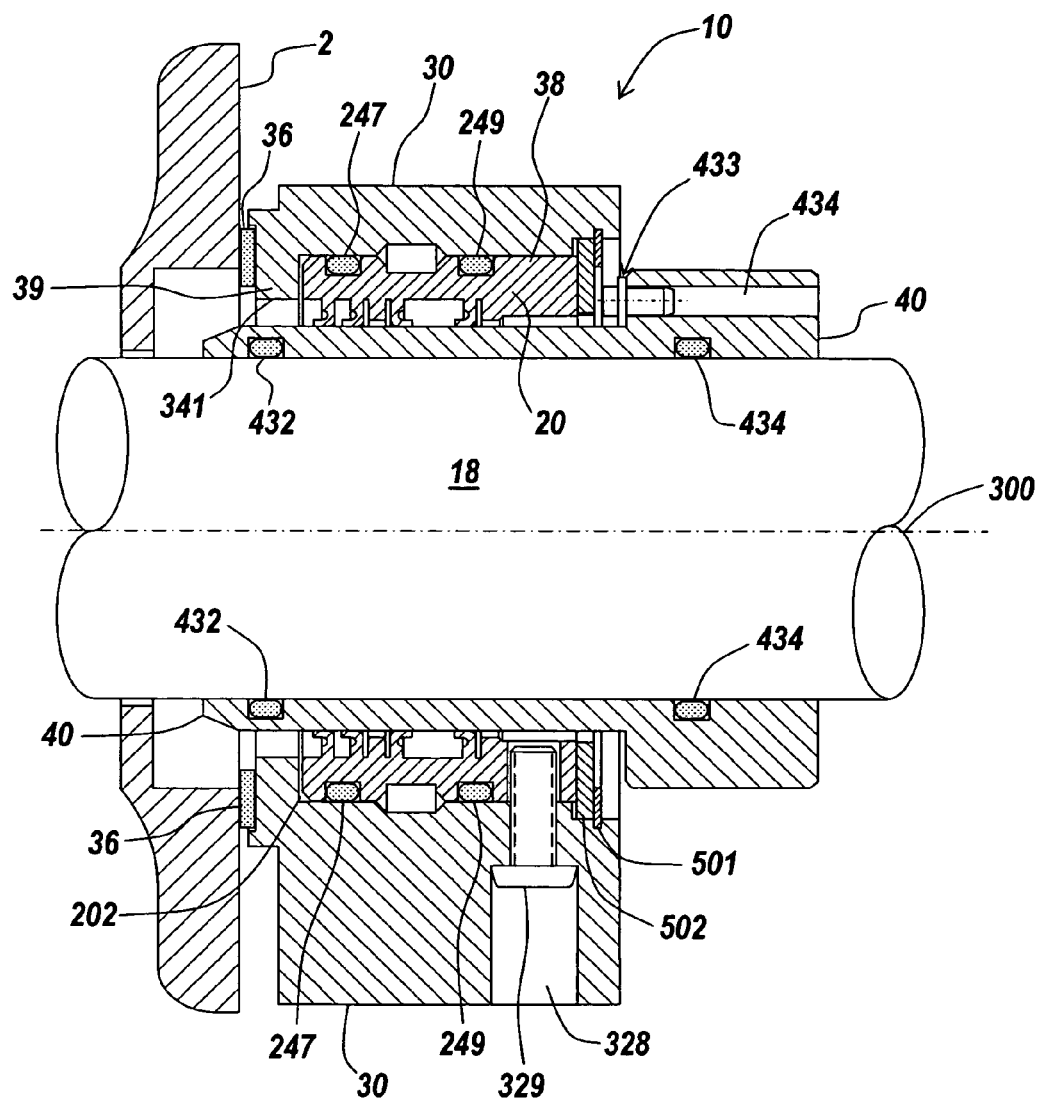
FIG. 1 is a cross-sectional side view a radial seal assembly of an illustrative embodiment of the invention mounted to a stationary system.
Figure 2:
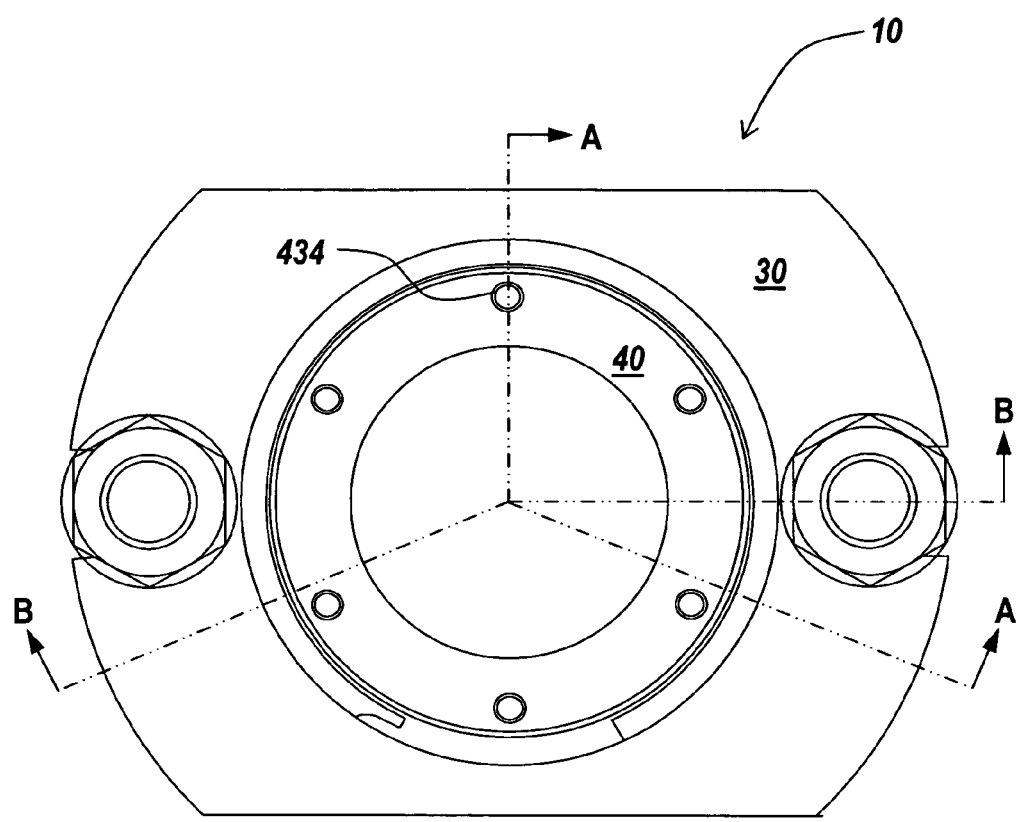
FIG. 2 is a cross-sectional frontal view of the radial seal assembly of FIG. 1.
Figure 3:
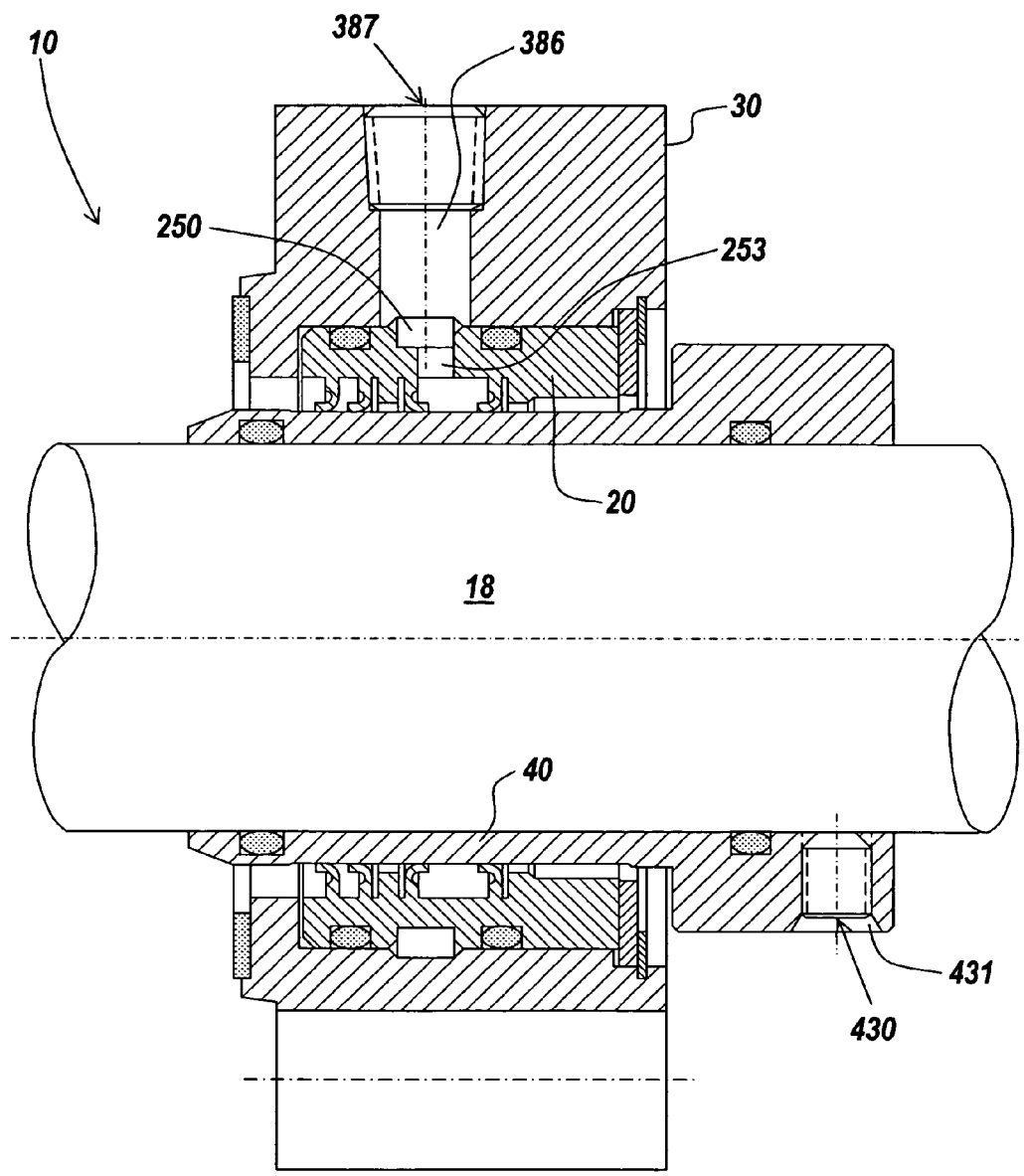
FIG. 3 is a cross-sectional view of the radial seal assembly through section B-B of FIG. 2.

An exemplary embodiment of a seal assembly 10 in accordance with the teachings of the present invention is illustrated in FIGS. 1-6. As shown in FIGS. 1-3, the seal assembly 10 is preferably concentrically disposed about a rotating or reciprocating shaft 18 or a rod extending from a system 2. The shaft 18 extends along an axis 300, and is partially mounted within the housing of the system 2. During operation of the mechanical system 2 that employs the illustrated seal assembly 10, the shaft 18 rotates about or reciprocates along the axis 300 relative to the system stationary equipment 2.

With reference to FIGS. 1 through 7, the illustrated radial seal assembly 10 includes a seal gland assembly 30 mounted to the stationary equipment 2, a sleeve 40 mounted to and movable with the shaft 18, and a sealing component 20 for sealing between the gland assembly 20 and the sleeve 40. Additional components are provided for mounting the seal gland assembly 30, sleeve 40 and/or sealing component 20 to components of the system and/or each other.

Figure 6:
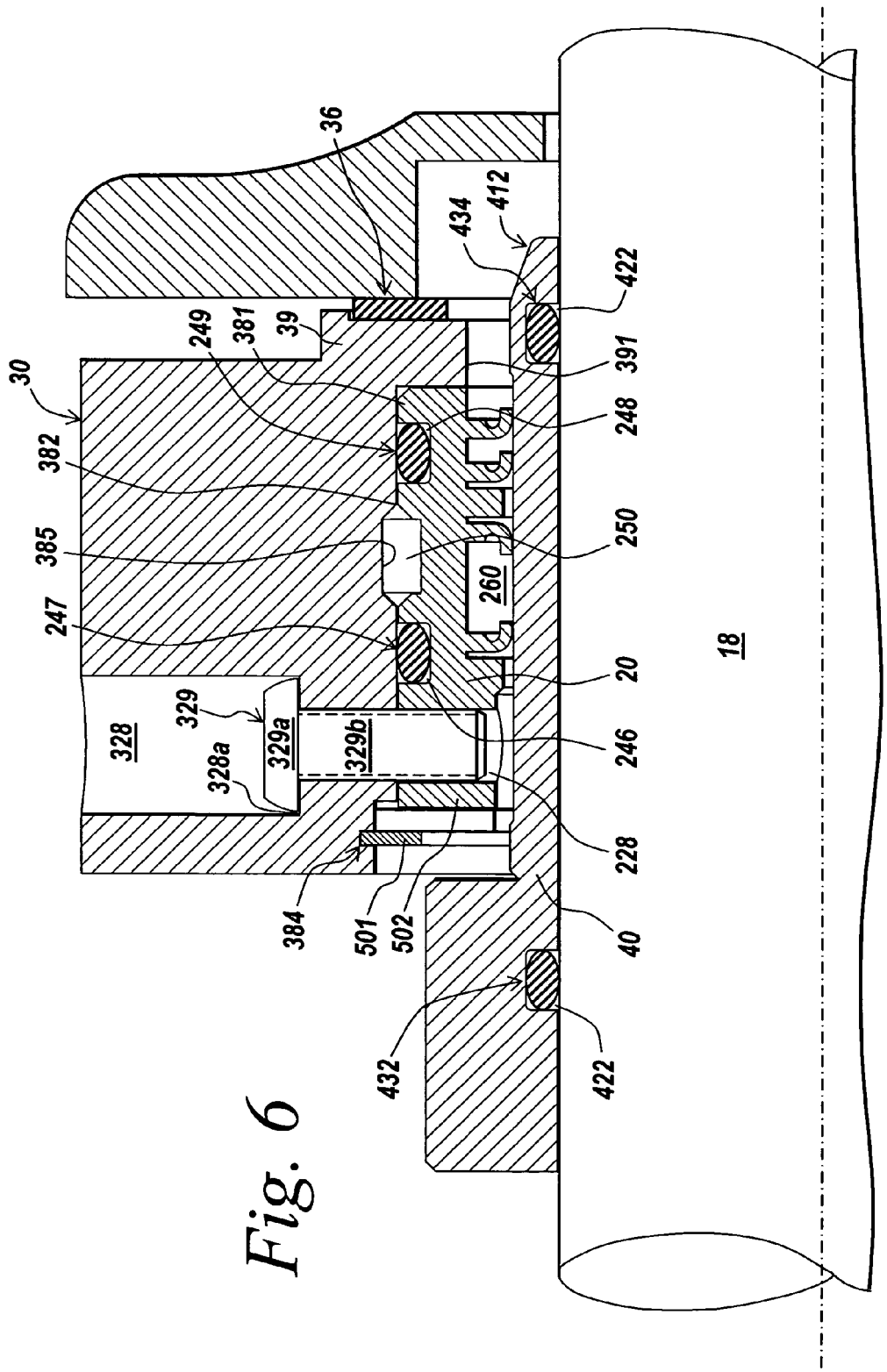
FIG. 6 is a detailed view of a section of the radial seal assembly of FIG. 1.

The seal gland assembly 30 comprises an annular body 32 concentrically disposed about the shaft 18 and positioned adjacent the housing 2 for connection thereto. As shown, the annular gland body 32 includes a groove forming an inner chamber 38 on a radially inner side thereof for housing the sealing component 20, described in detail below. Referring to FIG. 6, the inner chamber 38 is defined by an axially extending surface 382 extending from a radially extending inner surface 381 at the axially inner end of the annular gland body 32 towards the axially outer end of the annular gland body 32. A radially-extending wall 39 on the axially inner end of the gland body 32 defines a front wall 381 of the chamber 38. The wall 39 includes an axially extending inner surface 391 of reduced diameter relative to the surface 382.

The axially extending surface 382 may include steps 384 at an axially outer end thereof for accommodating mounting elements 501, 502 for the sealing component 20. The illustrative mounting elements 501, 502 comprise a snap ring 501 and a retaining washer 502 receiving an axially outer end of the sealing component 20 for maintaining the sealing component 20 in a selected axial position relative to the gland assembly 30, though one skilled in the art will recognize that any suitable means for mounting the sealing component in the chamber 38 may be used.

The annular gland body 32 may further including at one or more axially extending bore holes 328, each sized and configured to receiving an alignment bolt 329 for providing radial alignment and preventing rotation of the sealing component 20 relative to the gland 30. Each bore hole 328 aligns with a corresponding radially extending bore hole 228 in the sealing component 20 housed in the chamber 38. The alignment bolt 329 extends through the aligned bore holes to maintain the sealing component 20 in a selected position relative to the gland body 32. As shown, each bore hole 328 of the gland body has an upper portion having a larger diameter for receiving the head 329a of the bolt and a lower portion having a smaller diameter for receiving the stem 329b of the bolt, which extends into the bore hole 228 of the sealing component. The step 328a between the upper portion and the lower portion forms a seat for the bolt head 329a to prevent the bolt 329 from traveling too far into the sealing component 20.

The bolts 329 preferably prevent rotational movement of the sealing component 20 while allowing radial tracking of the sealing component 20 relative to the gland 30. In particular, the bolts 329 preventing rotation may facilitate operation of the seal assembly when there is increased friction between the moving shaft and the sealing component, for example when high viscosity fluids are present, causing the shear stress at the sealing component 20 and shaft interface to become larger than the frictional forces at the outside diameter of the sealing component 20.

One skilled in the art will recognize that any suitable means for mounting and providing alignment and/or preventing rotation of the sealing component within the chamber 38 of the gland 30 may be used and that the invention is not limited to the illustrative embodiment.

The gland 30 may also be configured to allow a barrier fluid to be used with the seal assembly 10. For example, as shown in FIGS. 1-7, the axially extending surface 382 of the gland body 32 may define a groove 385 in a central portion for mating with a groove 250 on the sealing component 20 to define a barrier fluid region, as described below. The barrier fluid region may be accessed by one or more barrier fluid holes 386 extending radially through the gland body 32 to form a barrier fluid port for providing barrier fluid to the barrier fluid region formed by mating grooves 385, 250. A barrier plug 387 may be inserted in the barrier fluid hole 386 to seal the hole when barrier fluid is not employed by the seal assembly 10.

Figure 4:
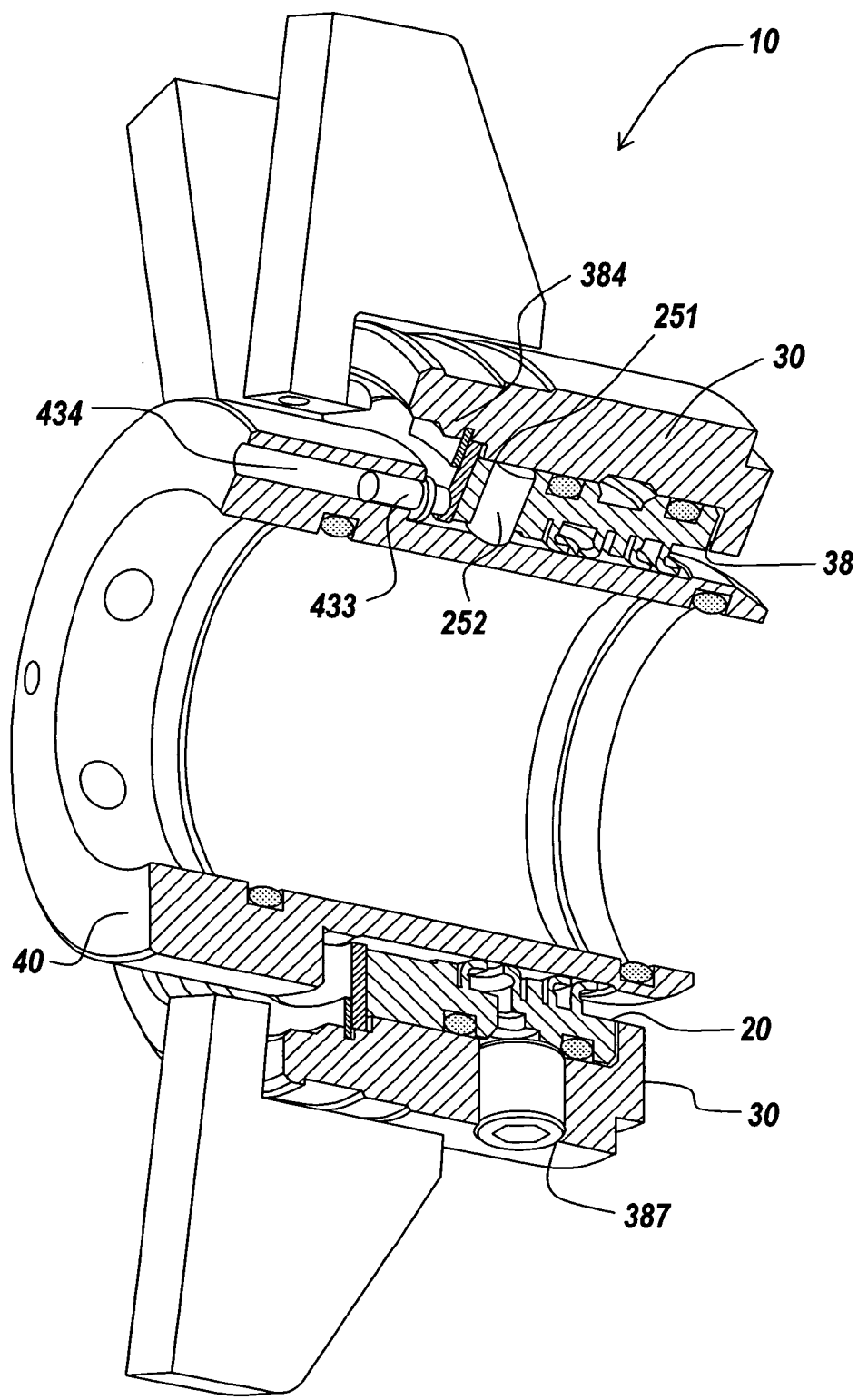
FIG. 4 is a cutaway perspective view of the radial seal assembly of FIG. 1 along section A-A of FIG. 2.
Figure 5:
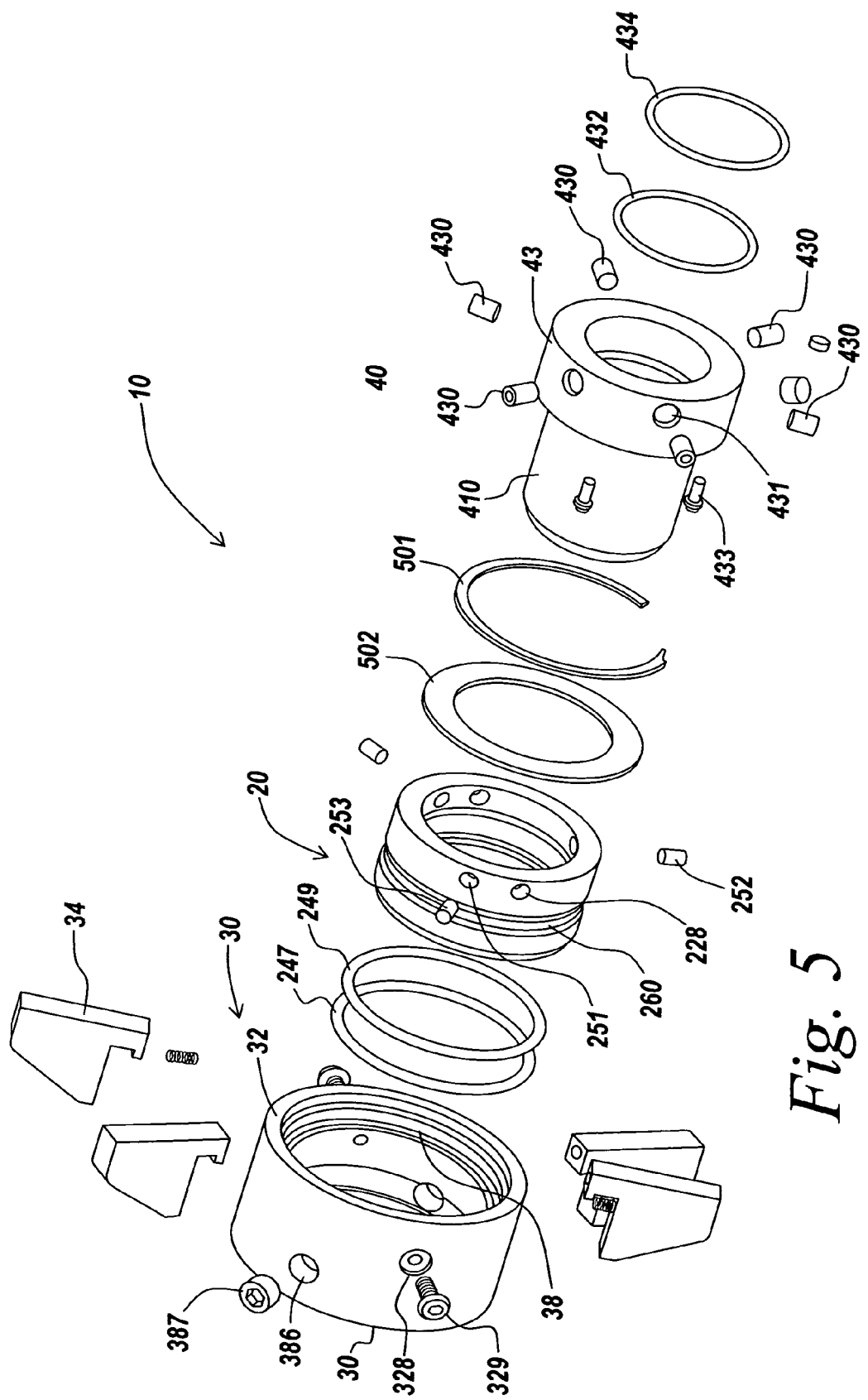
FIG. 5 is an exploded view of the radial seal assembly of FIG. 1.

As shown in FIGS. 4 and 5, the illustrated seal assembly 10 may further include bolt tabs 34 mounted to the annular body 32 of the gland 30, which may serve to mount the gland assembly 30 to the stationary equipment being sealed. The bolt tabs 34 help secure the gland assembly to the housing of the equipment by seating mounting bolts (not shown) between adjacent ones of the tabs. In use, a mounting bolt is inserted between a pair of adjacent bolt tabs. Each bolt tab 34 includes a hooked protrusion on an axially outward facing end for hooking onto the axially outer edge of the annular body 32. The bolt tabs 34 may be movable about the perimeter of the annular body 32 to facilitate flexibility in mounting the gland to the equipment. The bolt tabs 34 are described in further detail in U.S. Pat. No. 5,209,496, assigned to the assignee hereof, which is herein incorporated by reference.

As shown in FIGS. 1, 3 and 6, one or more gaskets 36 at an axially inner end of the gland 30 seal the interface between the stationary housing 2 and the annular body 32 and ensures a fluid tight seal between the seal assembly 10 and the stationary housing 2.

Figure 8:
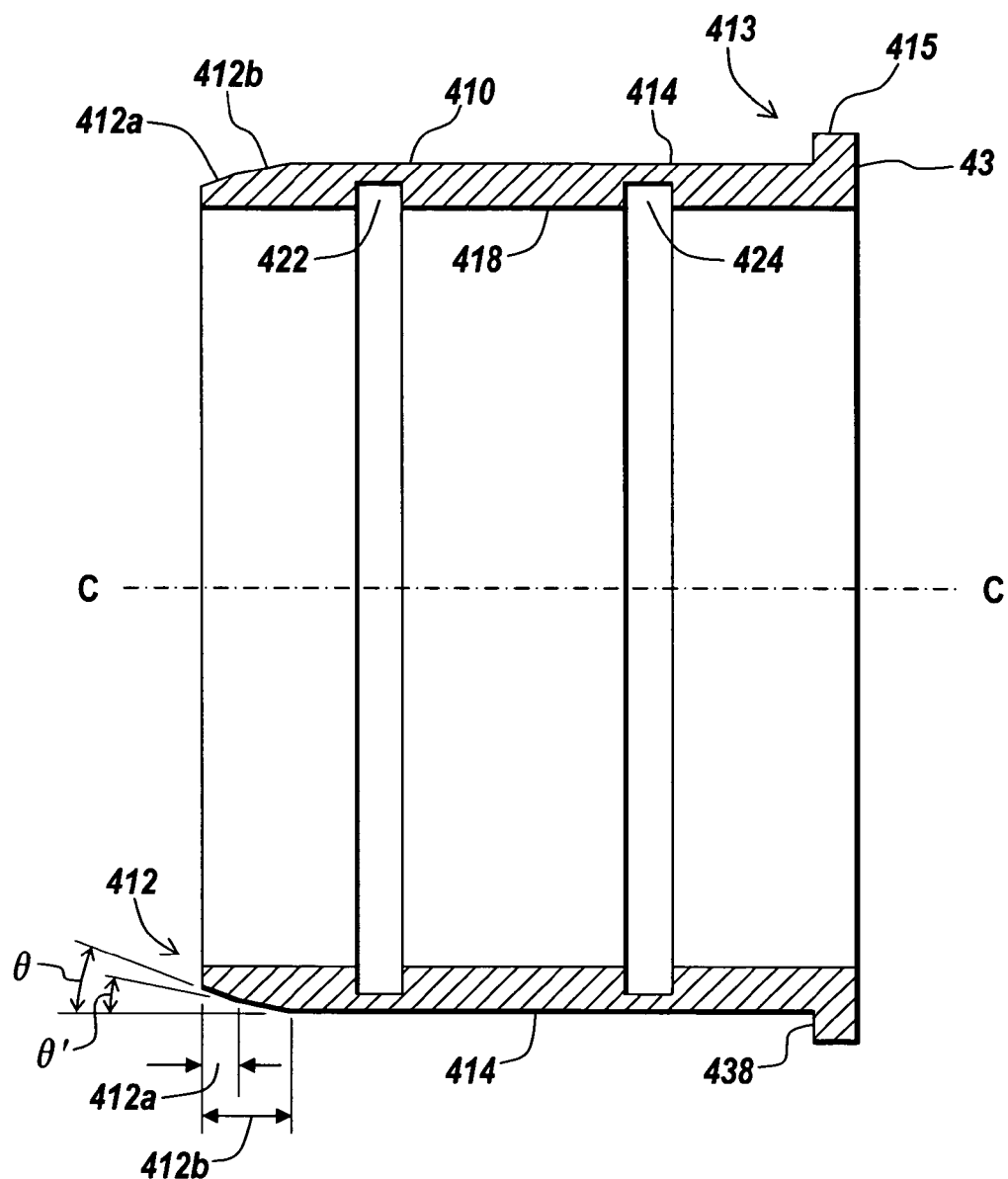
FIG. 8 illustrates the sleeve of the radial seal assembly according to an illustrative embodiment of the invention.

As illustrated in FIGS. 1-3 and 6, the sleeve 40 is disposed about the shaft 18 in a radially inner position relative to the gland assembly 30. As shown in FIG. 8, the sleeve 40 includes an axially-extending, cylindrical sleeve body 410 forming a flange 43 at an axially outer end thereof. The cylindrical sleeve body 410 has an axially inner end 412 and an axially outer end 413, as well as a radially outer surface 414 and a radially inner surface 418. The outer surface 415 of the flange 43 is stepped radially outward from the outer surface 414 of the sleeve 410 to define the flange 43, while the inner surface 418 of the sleeve 410 extends to the end of the flange 43. A radially extending, axially inward facing surface 438 extends between the outer surface 414 of the body 410 and the outer surface 415 of the flange 43. In a preferred embodiment, the outer diameter of the sleeve outer surface 414 is less than the diameter of the inner radial surface 391 of wall 39 the gland body 32. This clearance allows the sleeve 40 to seat within the gland assembly 30 for unobstructed rotational movement therein. As described in detail below, sealing surfaces of the sealing component 20 housed in the inner chamber 38 of the gland contact the outer surface 414 of the sleeve 40 to provide sealing between the gland 30 and the sleeve 40.

The diameter of the inner surface 418 of the sleeve 40 is preferably equal to or slightly greater than the diameter of the shaft 18, to which the sleeve 40 is to be attached, as illustrated in FIG. 1. The inner surface 418 has formed thereon an annular groove 422 at an axially inner end for housing a first seal, illustrated as o-ring 432. A second annular groove 424 may be formed in the inner surface 418 in an axially outer position relative to the first annular groove 422 for housing a second seal, illustrated as o-ring 434. The second annular groove 424 may be formed in the flange portion 43 of the sleeve, as shown in FIGS. 1-6 or in the sleeve body portion 410 of the sleeve on the inner surface 418, as shown in FIG. 8. When mounted in groove, the o-rings 432, 434 sealingly mate with the shaft 18, providing a fluid-tight seal along the sleeve and the shaft interface, as shown in FIGS. 1, 3 and 6.

The sleeve 40 may be mounted to the shaft 18 through any suitable means to allow the sleeve 40 to move with the shaft 18. As shown in FIGS. 3 and 5, the flange 43 of the sleeve 40 may include at least one radially extending hole 431, each receiving a set screw 430 to mount the sleeve 40 to the shaft 18. The set screws 430 operate to radially and axially secure the sleeve to the shaft 18, such that the sleeve 40 moves with the shaft 18. One skilled in the art will recognize that any suitable mounting means may be used in accordance with the teachings of the invention.

In addition, as shown in FIGS. 1, 2, 4 and 5, one or more centering pins 433 may be inserted in corresponding axially extending holes 434 in the axially inward facing, radially extending surface 438 of the flange 43 to provide axial and/or radial spacing of the seal components. The illustrative centering pins 433 provide axial and/or radial spacing relative to the snap ring 501 mounting the sealing component 20 in the inner chamber 38 of the gland. The axial space or depth of the housing 30 provides adequate space for the seal element 30. The radial spacing provides sufficient space to allow the seal element 30 to move according to any runnout of the sleeve 40. This minimizes wear of the sealing radially inward seal surfaces. The outside diameter of the seal element 38 is smaller than the inside diameter of the housing 30. The O-rings 247 and 249 provide static sealing for the seal element 30. The seal element moves in unison with the shaft runnout. Circumferential force is applied around the shaft via the radially inward sealing surfaces. This allows the seal element to move with the shaft.

The sleeve 40 is configured to facilitate mounting of the sealing component 20 thereon while providing a compact structure. For example, referring to FIG. 8, the axially inner end 412 of the sleeve is preferably tapered and may include at least two lead-in angles. The illustrative sleeve 40 includes a double-angled tip at the axial outer end 412 to provide deflection of the sealing surfaces of the sealing component 20 during installation. The first stage 412a, terminating in the axially inner edge of the sleeve, forms an outer surface extending at a first angle θ relative to the surface 414, which extends parallel to the axis C-C of the sleeve. The first stage 412a merges with a second stage 412b extending at a smaller angle θ' relative to the surface 414. The second stage extends to and intersects the outer surface 414. The use of a larger angle at the first stage of the tip 412 reduces the amount of axial force to install the seal due to its smaller diameter corresponding to the minimal diameter of the sealing component 20 prior to installation. The second stage of the lead-in has a decreased angle to match the larger seal inner diameter formed by the first stage of the lead-in.

The use of a tapered tip with two lead-in angles reduces the overall length of the sleeve and provides an overall more compact structure. In addition, the tapered tip also facilitates mounting of a sealing component with a reverse seal element, as described below. The double tapered tip 412 further reduces the uniform force used to install a sealing element onto the sleeve 40.

The particular angles of the first stage and the second stage relative to the perpendicular axis depend on several parameters, including the spacing, diameter of sealing component, length of sleeve, force required to mount seal and others parameters.

In the illustrative embodiment, the first angle θ is between about 15 and about 25 degrees and preferably about 20 degrees relative to the axially extending outer surface 414, the second angle θ' is between about 5 and about 15 degrees and preferably about 10 degrees, relative to the axially-extending outer surface 414, though one skilled in the art will recognize that the invention is not limited to these angles.

One skilled in the art will recognize that the tapered tip 412 is not limited to two lead-in angles and that the tapered tip may alternatively include three or more lead-in angles on the outer surface to facilitate mounting of a sealing component while providing a compact structure having a reduced length.

The sleeve 40 and the gland assembly 30 can be formed from any suitably rigid material, such as, for example, stainless steel or other metal alloys.

The sealing component 20 is configured provide fluid sealing and a leak-proof path between the stationary equipment 2 and the shaft 18, thereby preventing fluid from leaking from the system 2. As shown in FIGS. 1, 3, 4 and 6, the sealing component 20 is disposed in the inner chamber 38 formed between the gland 40 and the sleeve 30.

The seal assembly 10 may include a lip seal component 202 at the axially inner interface between the sealing component 20 and the gland 30 to ensure a fluid-tight connection.

Figure 7:
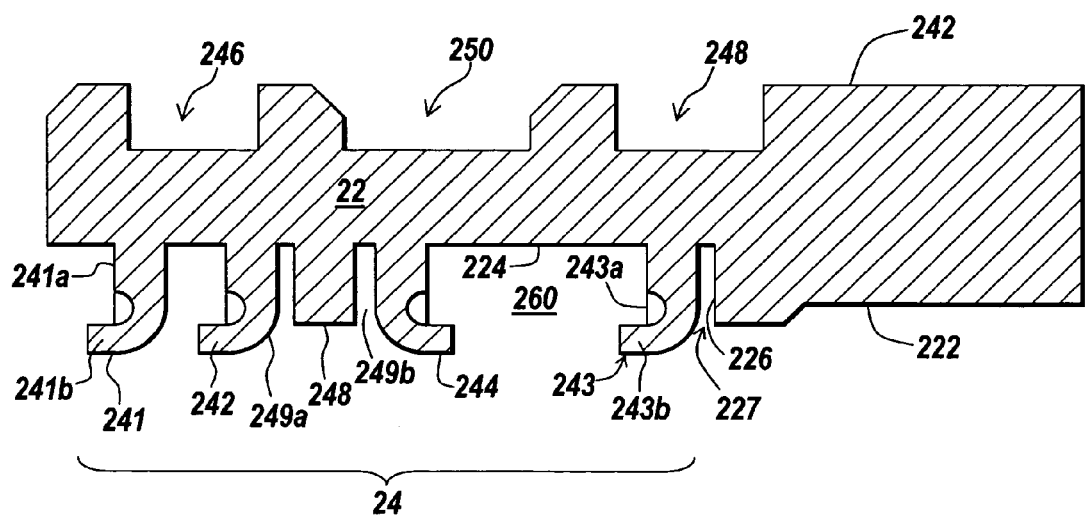
FIG. 7 is a cross-sectional view of the sealing component of the radial seal assembly of FIGS. 1-6.

With reference to FIG. 7, the sealing component 20 includes an annular body 22 and a plurality of sealing elements 24 forming sealing surfaces extending from a radially inner, axially extending surface 224 of the annular body 22. The sealing elements 24 contact and seal against the outer surface 414 of the sleeve 40 to prevent fluid from passing therebetween. Preferably, the sealing elements 24 include at least one axially inwardly extending seal surface, such as elements 241, 242, or 243, for sealing under positive pressure conditions and at least one axially outwardly extending seal element 244 for sealing under negative pressure conditions, as described in detail below.

The sealing component 20 accommodates both positive and negative pressure differentials during operation. In particular, the use of at least one forward-facing seal element and one rearward-facing sealing element allows for accommodation of various fluid situations during operation of the seal assembly.

The illustrative sealing component 20 includes a second axially extending inner surface 222 extending axially from an axially outer end of the sealing component towards the axially extending surface 224. The axially extending surface 224 is stepped radially outward from the second axially extending element 222 to accommodate the sealing elements 24, which extend from the first axially extending surface 224 and contact the sleeve 40. The inner diameter of the first surface 224 of the sealing component is preferably greater than or equal to the diameter of the second inner element 222, which is preferably greater than or equal to the diameter of the outer element of the sleeve 40 to permit mounting of the sealing component 20 upon the sleeve. A radially extending connecting wall 226 connects the first surface 224 to the second element 222 forming a step on the seal component 20.

As shown, the illustrative sealing elements 24 projecting from the wall 224 include two forward-facing seal elements 241, 242 at an axially inner end of the sealing component 20. The two forward-facing seal elements 241, 242 provide a redundant, double sealing at the axially inner end, which ensures sealing even at higher pressures. Alternatively, a single forward-facing seal element may be provided at the axially inner end of the sealing component 20.

A third forward-facing seal element 242 is formed near the wall 226. The third forward-facing seal element 242 is separated from the wall 226 by a gap 227.

The sealing elements 24 further include an axially rearward facing seal element 244 formed in an intermediate area of the surface 224 for providing sealing under reverse pressure conditions.

The axially rearward, forward-facing seal element 243 and the reverse seal element 244 form an inner annular chamber 260, which is also defined by the sleeve 40 and the first surface 224 when the seal assembly is assembled. The inner annular chamber 260 communicates with the barrier fluid holes 253 extending from the groove 250 on the outer surface of the sealing component. When barrier fluid is used in the seal assembly, the barrier fluid fills the chamber 260 and is sealed therein by the seal elements 243, 244. The barrier fluid may be used to eliminate effluent, cool and/or lubricate the sealing elements. The seal assembly 10 may alternatively operate without the use of barrier fluid.

In the illustrative embodiment, each seal element 241, 242, 243, 244 comprises a substantially straight, radially extending portion 241a, 242a, 243a, 244a, respectively, extending from the surface 224. A substantially straight, axially extending portion 241b, 242b, 243b, 244b for sealing against the sleeve 40 extends from the end of each radially extending portion 241a, 242a, 243a, 244a, respectively, such that each seal element 241, 242, 243, 244 has a substantially J-shaped cross section. The sealing surfaces defined by portions 241b, 242b, 43b and 244b may be formed by bending the tip of the radially extending portions 241a, 242a, 243a, 244a to form the substantially J-shaped seal elements. The forward facing seal elements 241, 242, 243 have tips that extend towards the pressure end of the equipment 2 (i.e., the axially inner end of the seal assembly) and provide sealing under normal pressure conditions. The tip of the rearward facing seal element 244 extends towards the axially outer end of the seal assembly and provides sealing under reverse pressure conditions, i.e., when the pressure within the equipment is less than ambient and/or barrier fluid, if used. The J-shaped configuration allows for an increase in the amount of sealing force proportionate to the fluid pressure applied to the respective seal element as the process pressure increases. One skilled in the art will recognize that the seal elements 241, 242, 243, 244 may have any suitable size, shape and configuration suitable for providing sealing between the gland 30 and the sleeve 40.

The use of multiple sealing elements in a single piece unit 20 allows easy handling and installation of the seal elements with the seal assembly. The sealing component 20 including the multiple sealing elements may be easily slipped into the equipment as a single unit.

In addition, the narrow section of the seal surfaces formed by the seal elements 241-244 provides sealing force to seal between the equipment and the shaft, while the circumferential elongation of the material provides sufficient sealing force in low process pressure situations.

A backing member 248 for stabilizing the seals extends between the inner forward facing seal element 242 and the rearward facing seal element 244. In the embodiments of FIGS. 1-7, the backing member 248 is a separate component from both seal elements 242, 244 and forms gaps 249a, 249b between the seal elements 242, 244, respectively. The gaps allow for selected movement of the sealing tips 241b, 242b, 243b and 244b of the seal elements, allowing the element to bend in an appropriate radius to provide a selected amount of tension around the shaft 18. As the pressure in the system 2 increases, each sealing element may deform (i.e., decreasing the radius of the seal element around the shaft) while maintaining its integrity with the support given by the backing member 248. The backing member 248 may also help prevent the sealing elements from blowing out under extremely high pressure conditions.

Figure 9:
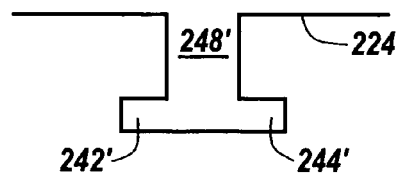
FIG. 9 illustrates an alternate embodiment of a sealing component used in a radial seal assembly according to an alternate embodiment of the invention.

According to an alternate embodiment of the invention, shown in FIG. 9, the backing member 248' may be integrally formed with one or both of the seal elements 242', 244' to form a T-shaped protrusion having an axially forward extending tip and an axially rearward extending tip.

Referring again to FIG. 7, the sealing component 20 further includes an axially extending radially outer surface 242. The diameter of the outer surface 242 is preferably less than the diameter of the top surface 382 of the inner chamber 38 of the gland 30 so that the sealing component 20 can be installed in the chamber 38. According to an illustrative embodiment, the sealing component 20 may be spaced from the axially extending inner surface 382 of the chamber 38 when the seal assembly 10 is assembled to allow floating of the sealing component 20 relative to the gland 30 in a radial direction. The gap between the sealing component outer surface 242 and gland inner surface 382 facilitates compensation for dynamic run out in the equipment by allowing the entire sealing component 20 to move instead of flexing the sealing tips of the seal elements. The radially outer surface 242 includes at one or more radially spaced apart grooves 246, 254 form receiving o-rings 247, 249 (shown in FIGS. 1 and 3-6) to seal against the inner surface 382 of the gland 382. The o-rings 247 and 249 further provide a spring-effect for allowing selective, controlled floating of the sealing component 20 relative to the gland 30 while maintaining a static seal against the equipment.

The illustrative sealing component 20 further includes a central groove 250 on the outer surface 242, which mates with the corresponding groove 385 on the inner surface of the chamber 38 to provide barrier fluid access. The illustrative grooves 250, 385 have slanted side surfaces to form a region having a near hexagonal shape in cross-section. However the barrier fluid region formed by mating grooves 250 and 385 may having any suitable size and shape. Radially extending barrier fluid holes 253 (shown in FIG. 2) may be formed in the sealing component 20 in communication with the barrier fluid groove 250 to provide a fluid path for the barrier fluid to allow the barrier fluid to pass into the inner chamber 260 and access the sleeve. Barrier fluid from a barrier fluid supply may be introduced to the barrier fluid region via the barrier hole 386 in the gland and then pass through the barrier fluid region, through the barrier fluid holes 253 in the sealing component in to the chamber 260 between the seal elements 243, 244 and the sleeve 40.

One skilled in the art will recognize that the barrier fluid bores are not limited to the number or shape described and illustrated herein. For example, a single barrier fluid bore can be provided. Likewise, the position and arrangement of the barrier fluid bores is not limited to those specifically disclosed herein, as alternative positions and arrangements are possible to achieve the same results.

The outer radially outer surface 242 of the sealing component may further include radially extending centering holes 251 formed in the axially outward portion of the seal element. Each centering hole 251 is configured to receive an elastomeric centering member 252, for centering the sealing component 20 on the sleeve 40, as shown in FIGS. 4 and 5. According to the illustrative embodiment, each elastomeric centering member 252 extends through the sealing component 20 and contacts the sleeve 40 during assembly and prior to operation of the seal assembly to facilitate installation and alignment of the seal components. The elastomeric centering member 252 is preferably formed of a material that causes the centering member 252 to ablate slightly from the heat generated due to the friction from the rotating surfaces after initial start-up of the seal assembly. The material may be a polymer based substance. The appropriate materials may be selected by the thermal degradation properties of the polymer. The temperature at which thermal degradation initiates should be at a level that can be generated by the frictional heat produced by the rotating components. During operation of the seal assembly, as the sleeve 40 moves with the shaft 18, the elastomeric centering mechanism 252 melts or otherwise erodes to prevent interference with operation of the seal and relative movement between the sleeve and sealing component.

The seal assembly illustrated in FIGS. 1-9 provides significant advantages over prior radial seal assemblies. For example, the use of both reverse and forward facing seal elements allows for sealing under a variety of pressure conditions, including reverse pressure conditions. The seal assembly provides a plurality of sealing surfaces formed on a single sealing component to facilitate assembly and operation of the seal assembly. The particular J-shaped cross-section of the sealing elements allows for a proportionate increase in sealing force as fluid pressure is applied to the sealing element, while the use of a backing member allows controlled deformation of the sealing element to ensure retention of the sealing component on the sleeve or shaft. The seal assembly may further allow controlled movement of a sealing component is a radial direction (i.e., radial tracking) to compensate for certain dynamics in the stationary system being sealed, while preventing rotation of the sealing component using bolts or another suitable anti-rotation device. The seal assembly further ensures precise alignment of seal components during assembly using alignment material that melts or otherwise retracts during operation to prevent interference during operation of the seal assembly. In addition, the use of a double tapered tip on the shaft sleeve facilitates mounting of the sealing component thereon while providing an overall compact structure.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

The invention claimed is:

1. A radial seal assembly for providing a seal around a shaft extending from stationary equipment, the shaft extending along a longitudinal axis, the radial seal assembly comprising:
   a sleeve disposed about the shaft;
   a gland connected to the stationary equipment surrounding at least a portion of the sleeve and defining a chamber on a radially inner surface thereof; and
   a sealing component disposed in the chamber, the sealing component comprising:
      a first axially extending surface formed on a radially inner surface of the sealing component,
      a second axially extending surface formed on the radially inner surface of the sealing component, wherein the first axially extending surface is stepped radially outward from the second axially extending surface and is connected to the second axially extending surface by a radially extending connecting wall,
      a plurality of seal elements integrally formed with the sealing component and extending from the first axially extending surface for sealing against a radially outer surface of the sleeve, the plurality of seal elements including a first seal element comprising a radially extending portion projecting from the first axially extending surface and a first seal surface extending in an axially rearward direction from an end of the radially extending portion of the first seal element, and
      a radially extending backing member integrally formed with the sealing component and extending from the first axially extending surface, wherein the first seal surface is formed on the first seal element and a second seal surface is formed on a second seal element of the plurality of seal elements that is separate from the first seal element, the second seal surface extending in an axially forward direction from an end of a radially extending portion of the second seal element, and a gap exists between the backing member and at least one of the first seal element and the second seal element.

2. The radial seal assembly of claim 1, wherein the sealing component further includes a second seal surface extending in a radially forward direction from a radially extending portion of one of the seal elements of the plurality of seal elements.

3. The radial seal assembly of claim 2, wherein the radially extending backing member is located between the first seal surface and the second seal surface.

4. The radial seal assembly of claim 3, wherein the backing member is integral with the first seal surface and the second seal surface.

5. The radial seal assembly of claim 1, wherein the backing member extends between the first seal element and the second seal element.

6. The radial seal assembly of claim 1, wherein the second seal element is disposed axially rearward of the first seal element, such that the first seal element and second seal element form a sealed annular chamber on a radially inner side of the sealing element.

7. The radial seal assembly of claim 6, wherein the sealing component includes at least one radially extending hole extending between a radially outer surface of the sealing component and the sealed annular chamber for providing barrier fluid from a barrier fluid source to the sealed annular chamber.

8. The radial seal assembly of claim 7, wherein the gland defines an annular groove on a top axially extending wall of the chamber that mates with an annular groove on the radially outer surface of the sealing component to form a barrier fluid region.

9. The radial seal assembly of claim 1, further comprising an anti-rotational device coupling the sealing component to the gland to prevent rotation of the sealing component relative to the gland while permitting radial movement of the sealing component relative to the gland.

10. The radial seal assembly of claim 1, wherein the sleeve includes an axially inner tapered tip having at least two lead-in angles.

11. The radial seal assembly of claim 1, wherein each seal element has a substantially j-shaped cross-section defined by a bent tip forming a sealing surface.

12. The radial seal assembly of claim 1, further comprising a plurality of centering members extending through radially extending alignment holes in the sealing component, the centering members formed of a material that erodes when friction is applied to prevent interference during operation.

* * * * *